Figure 9:
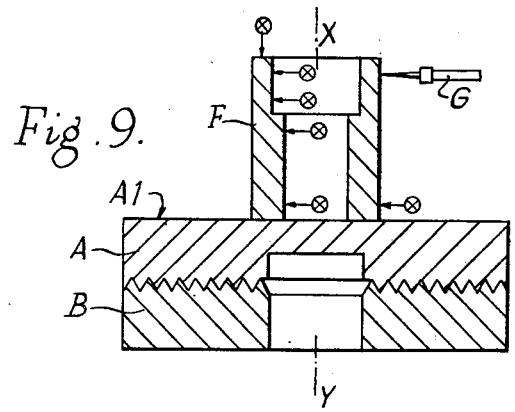

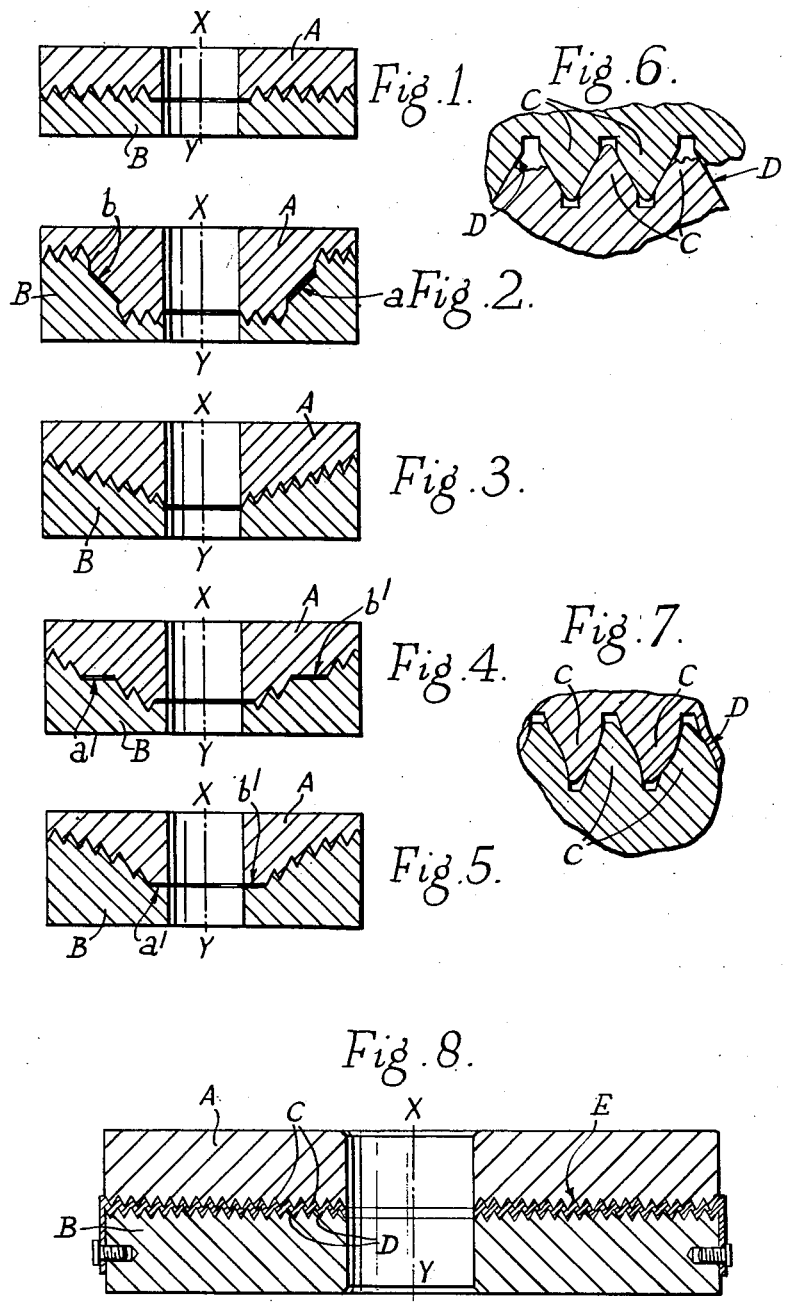

Jan. 29, 1963     H. G. HARRIS ETAL     3,075,816
BEARINGS FOR RELATIVELY ROTATING MEMBERS
Filed July 8, 1960     2 Sheets-Sheet 2

INVENTOR
Howard G. Harris
Christopher F. Phillips
BY
Wenderoth, Lind & Ponack
ATTORNEYS

United States Patent Office 3,075,816
Patented Jan. 29, 1963

3,075,816
BEARINGS FOR RELATIVELY ROTATING
MEMBERS
Howard Godfrey Harris, Malvern Wells, England, and Christopher Fowler Phillips, Somerville, Mass., assignors to Elliott Brothers (London) Limited, Century Works, Lewisham, London, England, a British company
Filed July 8, 1960, Ser. No. 41,576
Claims priority, application Great Britain July 13, 1959
15 Claims. (Cl. 308—135)

This invention relates to bearings for relatively rotating members and has for its main object to provide novel forms of bearings so constructed that one member rotates with a motion having a high degree of accuracy in relation to another member. That is to say, any point on the one member travels in a path which approximates very closely to a perfect circle about the axis of rotation and is maintained very closely in one plane which is normal to said axis. More particularly it is an object of the invention to provide a bearing in which a rotating member moves with substantially perfect circular motion, thus making the bearing suitable for use, for example, as a datum in the measurement of the roundness of manufactured components, and of the accuracy of surfaces of revolution.

According to the invention a rotational bearing comprises two axially separable members each having a contact face, at least one of these faces being formed with a plurality of annular ridges concentric with the axis of rotation engaging grooves formed in the other contact face so that the said ridges and grooves make contact with each other around annular surfaces.

In one embodiment of the invention, both said members are made of relatively rigid material and the ridges and grooves are formed so that the said annular contact surfaces are inclined to the axis of rotation at angles other than zero or ninety degrees and so that the bottoms of the grooves and the tops or apices of the ridges, either or both of which may be relieved, do not make contact with each other.

In another embodiment of the invention one of the members is made of or its contact face may be faced with a layer of relatively resilient material so that when this face bears on the annularly ridged contact face of the other, rigid, member accurately conforming grooves are formed in the resilient material.

In a further embodiment of the invention a thin sheet of resilient material having a low coefficient of friction is interposed between the said contact faces of said bearing members formed of relatively rigid material.

The two relatively rotating members of a bearing may work together dry, or may be lubricated with any liquid or dry lubricant that is appropriate to the materials of which the members are composed, the load on the bearing, and the speed of relative motion.

It will be understood that the contacting faces may have any form which is a surface of revolution and which can conveniently have formed upon it annular ridges or equivalent annular projections and corresponding or complementary grooves. The grooves and ridges may have any sectional form convenient for axial assembly.

Some embodiments of the invention are illustrated, by way of example, in the accompanying diagrammatic drawings, wherein:

FIGURES 1 to 5 are cross sections through a variety of rotational bearings in accordance with the invention, FIGURES 6 and 7 are enlarged fragmentary views showing two forms of grooves and ridges, FIGURE 8 is a view similar to FIGURE 1 showing a modified form of bearing, and FIGURES 9 to 13 are diagrams hereinafter more particularly referred to which relate to the application of a rotational bearing according to the invention to determining lack of roundness and of squareness of the end faces of a specimen of simple cylindrical form.

In each of the embodiments illustrated in FIGURES 1 to 5, two relatively rotating bearing members A, B are shown, one of which, for instance the lower one B, may be fixed, said members being provided with equi-spaced annular ridges C which provide complementary grooves D (see FIGURE 6). The simplest arrangement is that shown in FIGURE 1 where the zone of bearing contact between the flanks of the ridges and the sides of the grooves lies in a plane perpendicular to the axis X—Y of rotation of the bearing, the ridges C and grooves D being concentric to said axis X—Y. A variant of the FIGURE 1 arrangement is shown in FIGURE 2 where the contact zone lies in two parallel planes, perpendicular to axis X—Y, in stepped or terraced formation adjoined by coned faces $a$, $b$, between which a clearance is provided.

In the arrangement shown in FIGURE 3, the contact zone is of conical form a variant thereof being shown in FIGURE 4, where the coned contact zone is interrupted by clearance faces $a1$, $b1$, which, as shown, may be disposed perpendicular to the axis X—Y. Another variant of FIGURE 3 arrangement is shown in FIGURE 5, where the contact zone follows the course of a curve adapted, as well known, to afford uniform wear of the interfitting ridges and grooves.

It will be appreciated that the arrangement shown in FIGURES 2 to 5 provide for improved stability of the moving member in the event of eccentric loading being imposed on said member. Although the bearing members A, B are shown in FIGURES 1 to 5 in the form of separate discs adapted for mounting on machine parts between which a rotational connection is to be established it is to be understood that the ridges and grooves may be made on the machine parts themselves.

Two forms of interfitting ridges C and grooves D are illustrated in FIGURES 6 and 7, the former showing on an enlarged scale the symmetrical triangular forms of the ridges and grooves represented in the diagrammatic drawings FIGURES 1 to 5, FIGURE 7 shows one of several possible forms of ridges and groove arrangement, that illustrated shows the members in contact around surfaces of revolution generated by curved lines as opposed to straight lines in FIGURE 6.

Any suitable mode of manufacturing the bearing members or machine parts incorporating the bearing faces may be employed; a convenient method is to form the ridges and grooves by casting or machining and lapping the interacting surfaces by imparting to the bearing members or parts a continuous rotary motion.

The lapping process improves the contact surfaces by rotation in a path controlled by progressive averaging of the conflicting irregularities which are steadily worn away thus allowing substantially circular motion to be achieved and the process is continuous so that the bearing may be said to be "self-improving."

It will be appreciated that if one of the members is relatively resilient compared with the other, then the motion will be the average of that due to all the ridge and groove pairs acting together. It follows that the effect of the errors of individual ridge and groove pairs will be averaged out, and that the resultant relative motion of the members will be more accurate than that likely to be obtained from any one ridge and groove pair acting alone.

Accurate bearings made in accordance with this invention, for instance, of the forms exemplified in FIGURES 1 to 5, can be produced economically and quickly. It has, for example, been possible to secure an accuracy such as to permit of measuring the roundness of components (such as ball-races and ball-bearings) to within 3 micro-inches.

In most of the bearing arrangements above described there is actual contact of one member with another, but this is not essential and in some cases it may be desirable to interpose a suitably resilient material having a low coefficient of friction between the contact surfaces. This resilient material is conveniently used in the form of a thin soft layer or disc which is firmly anchored to one of the bearing members, usually for preference the stationary member. The use of such a layer eliminates the need for lapping or otherwise perfecting the bearing surfaces because provided the ridges and grooves are cast or machined with a reasonable degree of accuracy any slight imperfection will be compensated by the resiliency of the layer. An example of the use of an interposed resilient layer is illustrated in FIGURE 8, where an interleaf of polytetrafluoroethylene about .005 inch thick (the thickness is very much exaggerated in the drawing) is shown sandwiched between the rotating and fixed members, the interleaf being firmly secured to one of the members.

It may also be convenient to vent the said grooves by means of one or more radial holes or grooves, to allow the escape of air or lubricant or foreign bodies and dust from the said annular grooves.

FIGURE 9 illustrates somewhat diagrammatically the manner in which a rotational bearing in accordance with the invention may be applied to the measurement of geometric form of specimens of sensibly circular section.

The specimen F is securely mounted on the upper face A1 of the bearing member A, said face A1 constituting a bearing datum plane which is made complanate and at right angles to the defined axis of rotation X—Y of the bearing member A. By the application to the specimen F of a suitable measuring probe G positioned at selected distances measured from the datum plane A1 along the axis of rotation X—Y, and by recording the output from said measuring probe G, the contour variations of the specimen for the probe positions are thereby determined in planes at right angles to said axis of rotation.

Since the probe measurements are made with respect to one precise axis and plane of rotation of the bearing and thus to the specimen F, the precise relationship between the contours as recorded can be determined.

Figure 10:
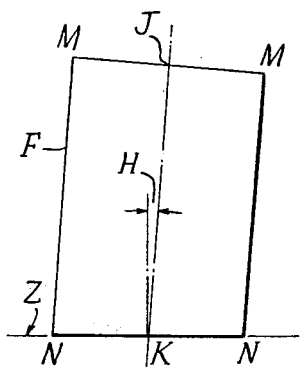
Figure 11:
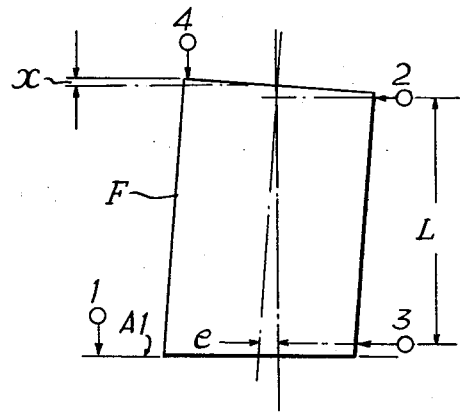
Figure 12:
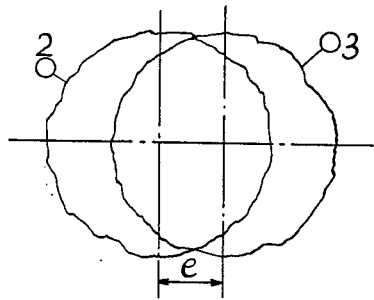

FIGURE 10 illustrates diagrammatically measurements which require to be made of a specimen F (such as shown in FIGURE 9), namely (i) the angle H that the axis J—K of the specimen makes with a reference surface Z which is represented by datum surface A1, and (ii) the lack of parallelism of the end faces MM, NN of said specimen. The manner of setting up the specimen F for measurement and of effecting such measurements are illustrated in FIGURE 11, where the first measurement made is at position 1 to check the levelness of the datum surface A1, the second measurement is made at position 2 to centre the specimen in the plane of measurement and the third and fourth measurements are made at positions 3 and 4 respectively, that at position 3—which is at distance L from position 2—measuring $e$ and that at position 4 measuring $x$. Measurement $e$ is used to derive angle H, that is, angle H equals $$\tan^{-1}\frac{e}{L}$$

Figure 13:
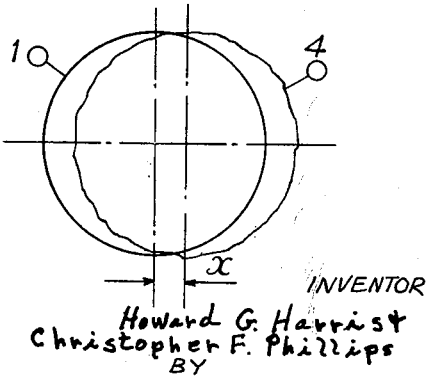

(FIGURE 12), which is the error in squareness of the face NN of the specimen with respect to its axis JK (FIGURE 10); the amount by which the faces MM—NN are out of parallel is given by $2x$ (FIGURE 13). Other suitable check measurements may be made at various positions in the bore of the specimen as indicated in FIGURE 9.

The deviations from their respective true circles of the measuring probe output records 2 and 3 (FIGURE 12) are the errors in roundness of the specimen in the two measuring planes 2 and 3 (FIGURE 11), and the deviation from a true circle of the measuring probe output record 4 (FIGURE 13) is the departure from a true plane of that position of the surface MM, as described by the circle of contact of the measuring probe 4 (FIGURE 11).

It will be understood that in practice one or more intermediate members may be interposed between the rotating bearing member A and the specimen F. This will allow of accurate centering of the specimen F in the plane of measurement and inclination of the datum surface to allow a selected surface of the specimen to be used thereafter as a reference surface.

A rotational bearing according to the invention may be applied to many instruments and machine tools, wherever there is a need to define a precise axis and/or plane of rotation. For example, precision angular dividing can be accomplished by employing the improved bearing in instruments such as dividing heads and indexing tables which are used for manufacture as well as for inspection purposes and require their axes of rotation to be precisely defined. In this class of instrument can be included also theodolites, gear testing machines, gyro test tables and circular scale dividing engines. The invention is also applicable to precision form generating when the improved bearings are used as workhead and tailstock bearings for grinding, milling, jig-boring machines and lathes.

We claim:

1. A bearing comprising two members, one member being rotatable relative to the other member about an axis of rotation, each member having at least two circular contact faces thereon oppositely inclined with respect to the axis of rotation and concentric with said axis of rotation, each contact face on one member mating with a face on the other member to form a pair of faces made up of a near contact face and a remote contact face, the near contact face being nearer the axis of rotation than the remote contact face, relief surfaces on said bearing members between said contact faces, said relief surfaces joining said contact faces and forming edges therewith, the relief surfaces on said members each defining a recess therein, the near contact face of each pair of mating faces extending into the recess formed by a relief surface beyond the edge of the remote contact face of each pair of mating faces which is nearer the axis of rotation, and the remote contact face of each pair of mating contact faces extending into a recess formed by the relief surface beyond the edge of the near contact face of each pair which is farthest from the axis of rotation.

2. A bearing adapted to be loaded substantially paralled to the axis of rotation thereof and comprising two members, one member being rotatable relative to the other member about an axis of rotation, each member having at least two circular contact faces thereon oppositely inclined with respect to the axis of rotation and concentric with and spaced radially from the axis of rotation, each contact face on one member mating with a face on the other member to form a pair of faces made up of a near contact face and a remote contact face, the near contact face being nearer the axis of rotation than the remote contact face, relief surfaces on said bearing members between said contact faces, said relief surfaces joining said contact faces and forming edges therewith, the relief surfaces on said members defining recesses therein, the near contact face of each pair of mating faces extending into the recess formed by a relief surface beyond the edge of the remote contact face of each pair of mating faces which is nearer the axis of rotation, and the remote contact face of each pair of mating contact faces extending into a recess formed by the relief surface beyond the edge of the near contact face of each pair which is farthest from the axis of rotation.

3. A rotational bearing comprising first and second members having a common axis of relative rotation, said first member having at least two bearing faces oppositely inclined with respect to the axis of rotation and of substantially conical male form, concentric to said axis of rotation and having a relief recess at the root of each male bearing face, said second member having at least two bearing faces of substantially conical female form complementary to said male bearing faces and also concentric to said axis of rotation and having a relief recess at the root of each female bearing face, said first and second members being in bearing engagement such that said male bearing faces extend into the relief recesses of the female bearing faces and that said female bearing faces extend into the relief recesses of the male bearing faces.

4. A rotational bearing comprising first and second members having a common axis of relative rotation, said first member having at least two bearing faces in substantially V formation forming a circular ridge concentric to said axis of rotation and having a relief recess at the root of each side of said ridge and said second member having bearing faces complementary to said V-shaped ridge bearing faces and forming at least one circular V groove also concentric to said axis of rotation and having a relief recess at the bottom of said groove, said first and second members being in bearing engagement with said ridge bearing faces extending into the relief recess of said groove and said groove bearing faces extending into the relief recesses at the roots of the sides of said ridge.

5. A rotational bearing as claimed in claim 4 in which there are a plurality of ridges and a plurality of grooves.

6. A rotational bearing as claimed in claim 5 in which said ridges are equidistantly spaced from each other and said grooves are equidistantly spaced from each other.

7. A rotational bearing as claimed in claim 5 wherein the grooves and ridges of the engaging bearing members are of substantially symmetrical triangular form in cross section.

8. A rotational bearing as claimed in claim 5, wherein the grooves and ridges of the engaging bearing members are of asymmetrical triangular form in crosssection.

9. A rotational bearing as claimed in claim 5, wherein the circular contact surfaces between the engaging grooves and ridges all lie in a common plane located at right angles to the axis of rotation of the bearing.

10. A rotational bearing as claimed in claim 5, wherein the circular contact surfaces between the engaging grooves and ridges lie on a surface of revolution of shallow cone form.

11. A rotational bearing as claimed in claim 5, wherein the circular contact surfaces between the engaging grooves and ridges lie on a surface of revolution having a curvature determined to provide for uniform wear of the interfitting ridges and grooves.

12. A rotational bearing as claimed in claim 5, wherein the contact faces of the bearing members are of terraced form, with at least one annular portion between adjacent parts of the terraced contact faces relieved, so as to confine bearing contact to the sides of the grooves and the flanks of the ridges.

13. A rotational bearing as claimed in claim 5, wherein at least the contact face of one of said bearing members is made of relatively resilient material and the other of said bearing members is made of rigid material, the resilient material acting as an averaging medium.

14. A rotational bearing as claimed in claim 5, wherein both bearing members are made of rigid material and a thin sheet of resilient material having a low coefficient of friction is interposed between the contact faces of the two bearing members.

15. A bearing comprising two members, one member being rotatable relative to the other member about an axis of rotation, each member having a plurality of pairs of circular contact faces, at least two of said circular contact faces thereon being oppositely inclined with respect to the axis of rotation, said faces being concentric with said axis of rotation, each contact face on one member mating on a face on the other member, said oppositely inclined faces forming a pair of faces made up of a near contact face and a remote contact face, the near contact face being the nearer of the axis of rotation than the remote contact face, relief surfaces on said bearing members between said contact surfaces, said relief faces joining said contact faces and forming edges therewith, the relief surfaces on said members each defining a recess therein, the near contact face of each pair of mating faces extending into the recess formed by a relief surface beyond the edge of the remote contact face of each pair of mating faces which is nearer the axis of rotation, and the remote contact face of each pair of mating contact faces extending into a recess formed by the relief surface beyond the edge of the near contact face of each pair which is farthest from the axis of rotation.

References Cited in the file of this patent

UNITED STATES PATENTS

| | | |
|---|---|---|
| 154,063 | McClelland | Aug. 11, 1874 |
| 324,383 | Jewett | Aug. 18, 1885 |
| 345,621 | Crawbuck | July 13, 1886 |
| 354,784 | Gorsuch | Dec. 21, 1886 |
| 599,150 | Reilly | Feb. 15, 1898 |
| 1,386,491 | Brown | Aug. 2, 1921 |
| 1,966,795 | Garrison | July 17, 1934 |
| 2,504,960 | Brandon | Apr. 25, 1950 |
| 2,809,130 | Rappaport | Oct. 8, 1957 |

FOREIGN PATENTS

| | | |
|---|---|---|
| 510,979 | Canada | Mar. 15, 1955 |
| 816,050 | Great Britain | July 8, 1959 |